Figure 1:
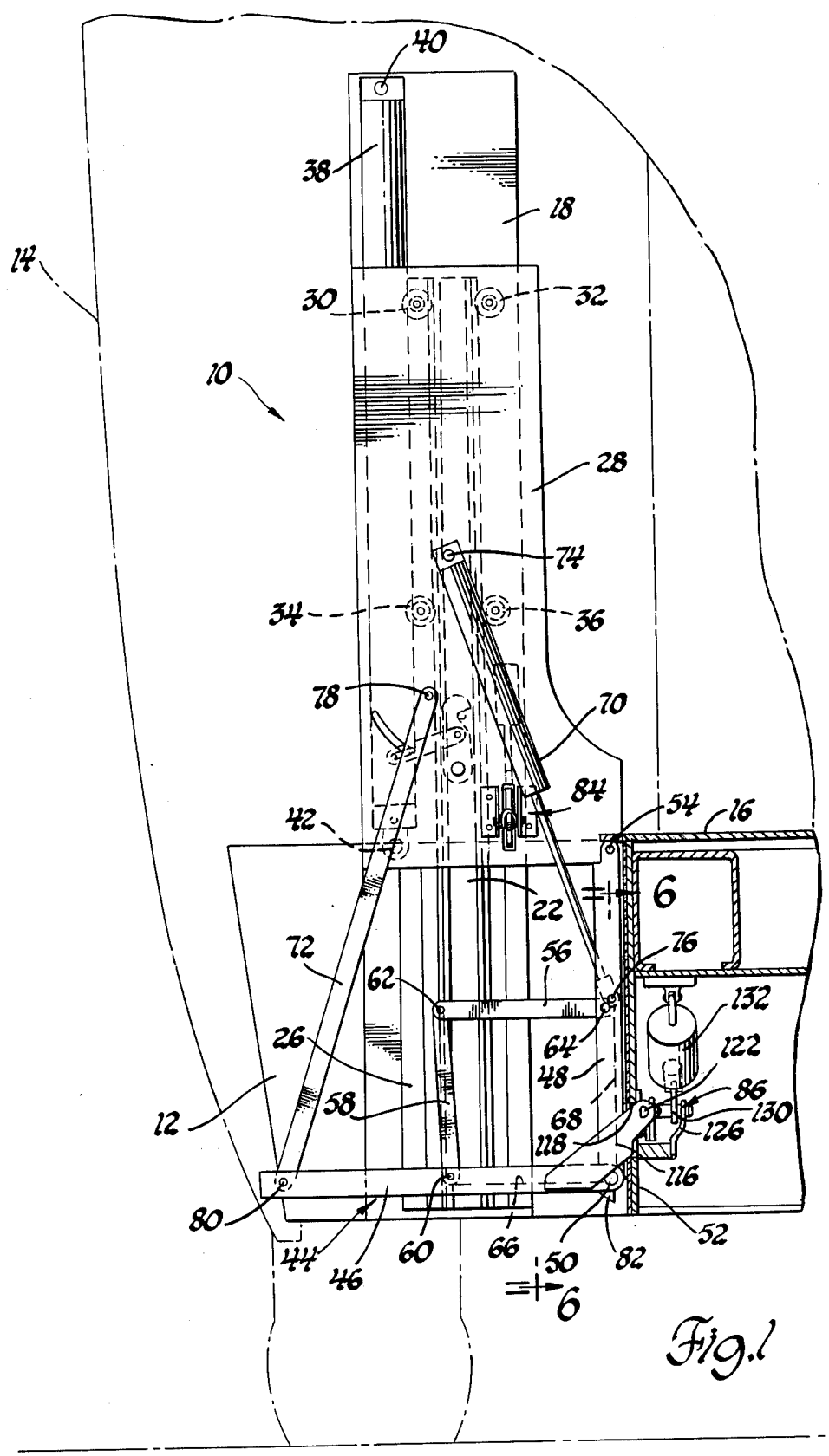

United States Patent [19]

Hawks

[11] 4,124,100

[45] Nov. 7, 1978

[54] LOCKING ARRANGEMENT FOR WHEELCHAIR LIFT DEVICE

[75] Inventor: Dale A. Hawks, Clarkston, Mich.

[73] Assignee: General Motors Corporation, Detroit, Mich.

[21] Appl. No.: 877,239

[22] Filed: Feb. 13, 1978

[51] Int. Cl.² ............................ B60P 1/44; B60R 3/02
[52] U.S. Cl. .................................. 187/9 R; 214/75 R; 280/166
[58] Field of Search .......................... 187/1 R, 9 R, 10; 214/75 R, 75 H, 75 G, 75 T; 280/166; 296/62; 105/443, 447, 449

[56] References Cited

U.S. PATENT DOCUMENTS 4,027,807  6/1977  Thorley ............................ 214/75 R Primary Examiner—Evon C. Blunk
Assistant Examiner—Jeffrey V. Nase
Attorney, Agent, or Firm—Edward J. Biskup

[57] ABSTRACT

A wheelchair lift device including a platform located in the stepwell of a motorcoach for raising and lowering a wheelchair and including foldable hinged sections that are movable through a linkage to a first position to form steps for use by able-bodied persons and are extendible laterally outwardly relative to the stepwell to a second position to align the hinged sections along a horizontal plane and thereby form a vertically movable platform for supporting the wheelchair. A locking arrangement including first and second latch means is associated with the hinged sections for locking the latter in the first and second positions.

3 Claims, 6 Drawing Figures

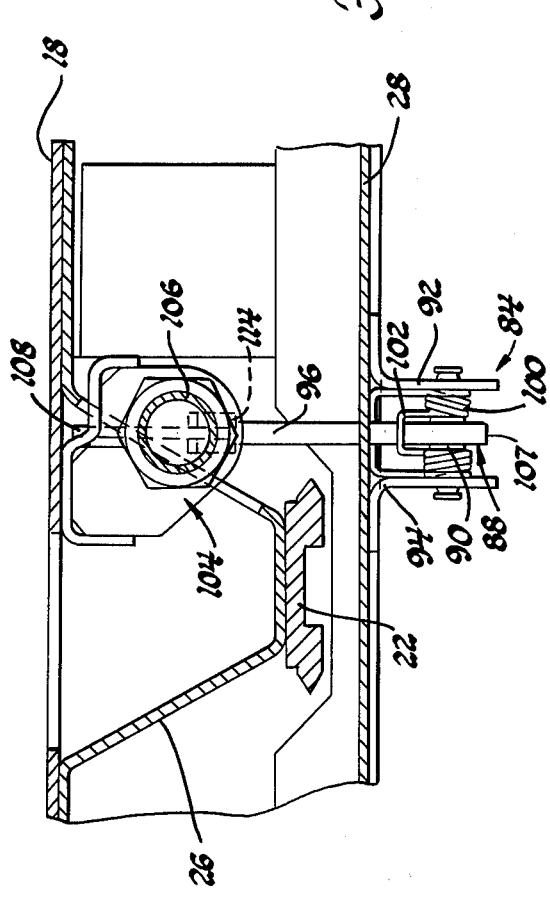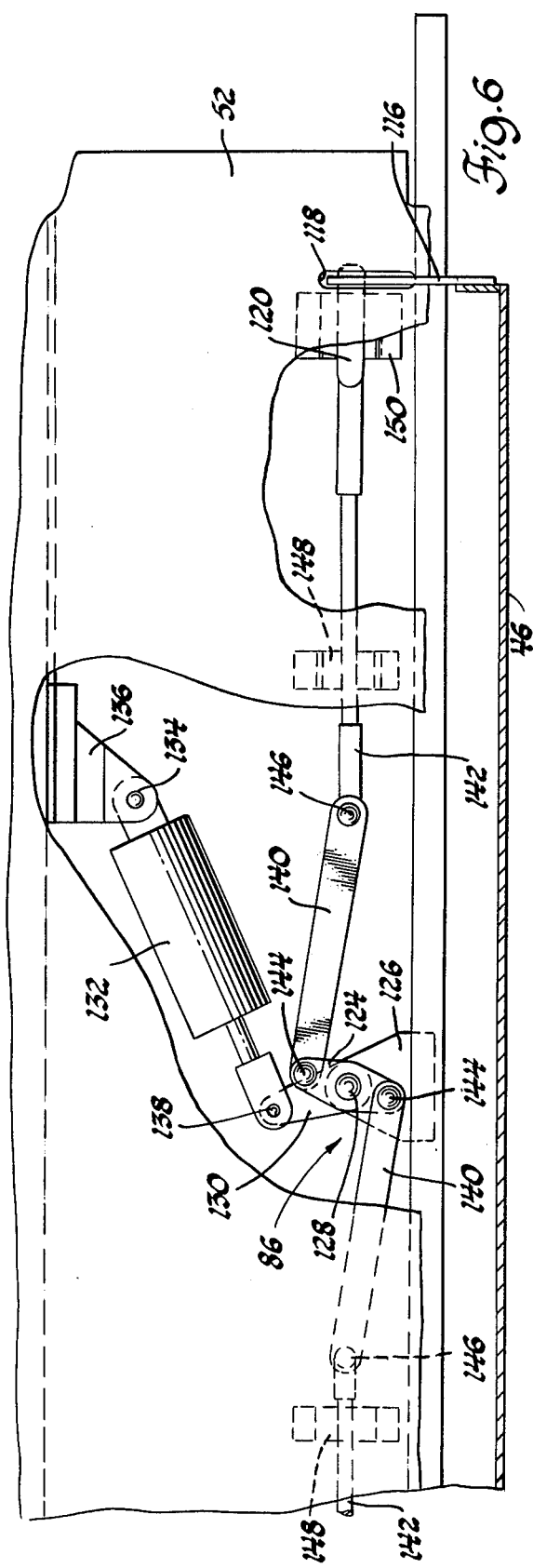

LOCKING ARRANGEMENT FOR WHEELCHAIR LIFT DEVICE

This invention concerns elevator devices in general and more particularly a wheelchair lift device that can be used with a motor vehicle and employs a locking arrangement for positively maintaining a foldable stairway in a step-forming position and in a deployed load supporting horizontal position.

Co-pending patent application U.S. Ser. No. 839,321 entitled "Wheelchair Lift Device", in the names of Dale A. Hawks, Daniel L. Kline and James T. Hogan, filed on Oct. 4, 1977 and assigned to the assignee of this invention, of this invention, discloses a lift device for use in a motorcoach that includes a pair of substantially vertically oriented guide bars secured to the body of the vehicle on the opposite sides of the doorway that leads into the interior of the vehicle. A carriage is mounted on each of the guide bars for movement from a raised position to a lowered position, and a pair of links connect the carriage with a platform assembly which includes a plurality of hinged sections that normally form a stairway having treads and risers when the carriage is in the raised position. One of the links consists of a power-operated linearly extensible and contractible member while the other link is a rigid member with one end pivotally connected to the carriage and the other end connected to one of the hinged sections. The arrangement of the links and the hinged sections is such that when the power-operated link member is contracted, the hinged sections move laterally outwardly relative to the doorway and cause the platform assembly to be formed into a horizontal support located in the plane of the vehicle floor. After the platform assembly is deployed in line with the vehicle floor, the carriage then is moved from the raised position to the lowered position so as to place the wheelchair support at ground level.

The present invention concerns a wheelchair lift device of the type described in the above-mentioned patent application but is an improvement thereover in that a locking arrangement is provided which serves to positively maintain the platform in a horizontal attitude after it is deployed and also serves to positively hold the hinged sections of the platform in the step forming position. More specifically, the locking arrangement includes a first latch having a lock member pivotally mounted on a bracket secured to the carriage. The lock member is formed with an arm at one end and a hook portion at the other end which is adapted to move into an opening formed in said one of the base sections when the latter assumes the horizontal load support position. A spring continuously biases the lock member into a locked position wherein the hook portion is located in the path of movement of the aforesaid base section and allows the latter to engage a curved surface on the hook portion to move the lock member against the bias of the spring into an unlocked position prior to the hook portion moving into the opening in the aforementioned base section as the sections move from the step forming position to the load support position. A lever is pivotally supported in the carriage and has a contact surface located adjacent the arm of the lock member that is engaged by a power operated cylinder for moving the lock member to the unlocked position so as to release the associated base section. The second latch is associated with the other base section of the platform assembly that has a projection formed thereon which extends into an opening in the vehicle body when in the step-forming position. An elongated bolt is supported for longitudinal movement by the vehicle body and is operated by a power cylinder so as to move into an aperture in the projection for locking the stairway in position.

The objects of the present invention are to provide a new and improved locking arrangement for a wheelchair lift device that includes a first latch for locking one of the base sections of the platform assembly to a movable carriage on the lift device when the platform assembly is in a load support position and a second latch for locking the other of the base sections to the fixed framework of the vehicle when the hinged sections form the stairway leading into the vehicle; and to provide a new and improved locking arrangement for a motor vehicle wheelchair lift device which serves to positively maintain the hinged sections of a support platform in a horizontal attitude by connecting one of the hinged sections to a vertically movable carriage and also serves to positively maintain the hinged sections in a step-forming position by connecting another of the hinged sections to the vehicle body.

Figure 2:
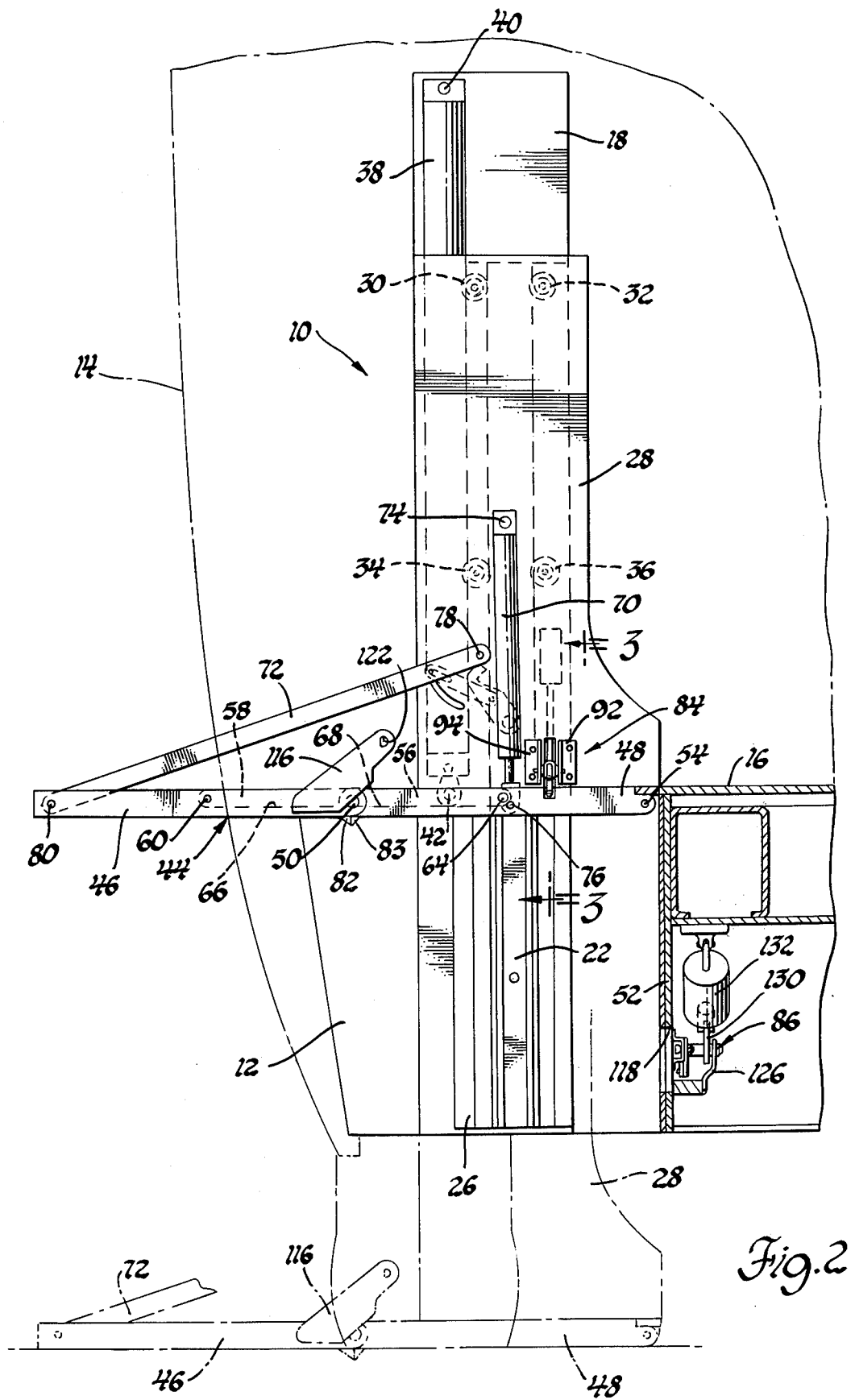
Figure 3:
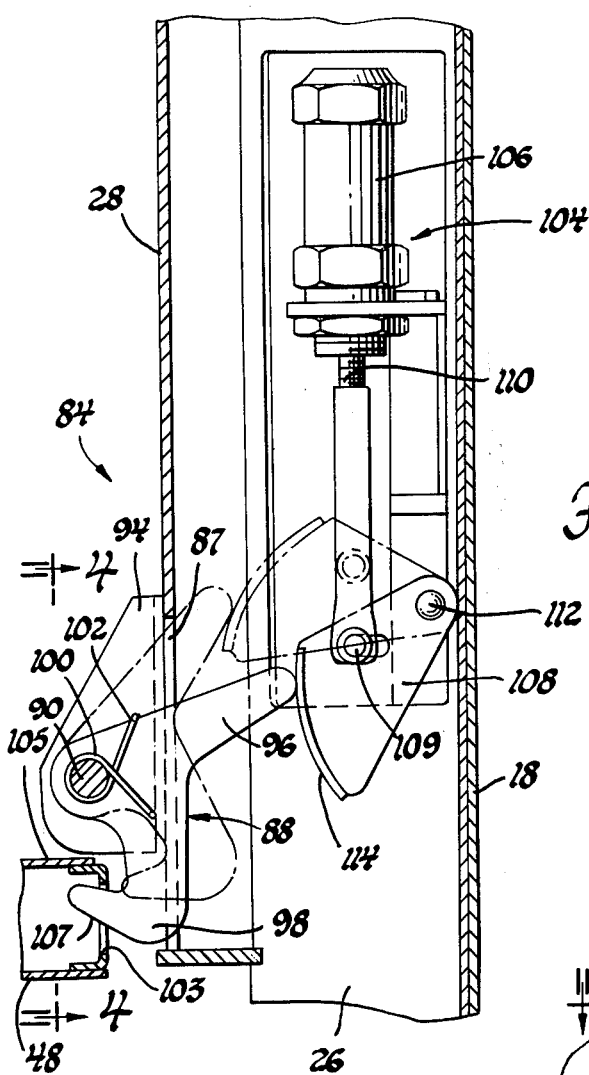
Figure 4:
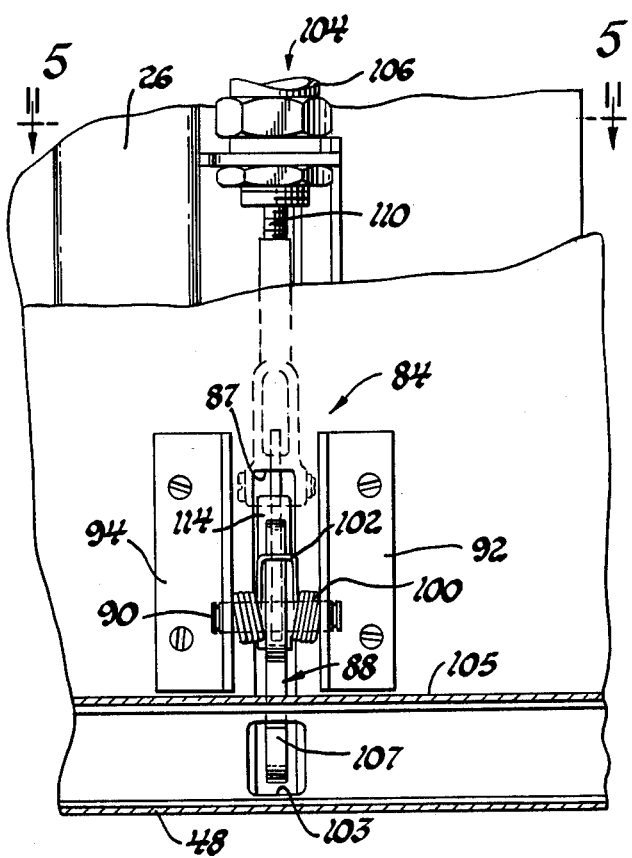

Other objects and advantages of the present invention will be more apparent from the following detailed description when taken with the drawings in which:

FIG. 1 is a side elevational view of a wheelchair lift device incorporating a locking arrangement made according to the invention, FIG. 2 is a view similar to FIG. 1 but shows the platform assembly in the deployed load support position, FIG. 3 is an enlarged view taken on line 3—3 of FIG. 2 showing one of the latches which forms a part of the locking arrangement, FIG. 4 is a view taken on line 4—4 of FIG. 3, FIG. 5 is a view taken on line 5—5 of FIG. 4, and FIG. 6 is an enlarged view taken on line 6—6 of FIG. 1 of the other of the latches which forms a part of the locking arrangement.

Referring to the drawings and more particularly FIGS. 1, 4 and 5 thereof, a wheelchair lift device 10 identical to the lift device disclosed in the aforementioned patent application is shown positioned within the stepwell 12 of a motor vehicle 14 such as a coach or bus of the type used in mass public transit having the usual floor 16 which is at an elevation substantially above ground level. As will be more apparent as the description proceeds, the wheelchair lift device 10 provides the usual two steps in the stepwell 12 of the vehicle permitting normal entry and exit for able-bodied passengers. In addition, and when it is desired, the steps of the wheelchair device 10 can be converted through a suitably arranged linkage into a horizontal support for a wheelchair that can be moved between an aligned position with the vehicle floor 16 and a ground level position. In this manner, a physically handicapped person confined to a wheelchair can be served by the vehicle 14.

More specifically, the wheelchair lift device 10 comprises a pair of frame members 18 spaced along an axis parallel to the longitudinal axis of the vehicle 14 and located on the opposite sides of the stepwell 12 of the vehicle 14. Only one of the frame members 18 is shown secured in a vertical position to the associated frame structure of the vehicle 14 and rigidly supporting a vertically disposed guide bar 22 which is secured to the associated frame member through a generally "V" shaped bracket 26 as seen in FIG. 5. The guide bar 22 has the side edges thereof shaped in the form of a "V" when viewed in cross section in FIG. 5, and is adapted to support a carriage 28. In this connection, it will be noted that the carriage 28 includes an upper pair of horizontally aligned rollers 30 and 32 and a lower pair of horizontally aligned rollers 34 and 36 which engage and ride along the guide bar. A double-acting hydraulic cylinder 38 is mounted to the frame member 18 and is connected to the carriage 28 for moving the latter between the positions shown in FIG. 2 and to a lowered position as shown in FIG. 3 of the aforementioned patent application. The hydraulic cylinder 38 includes a cylinder member and a relatively movable piston member. As seen in FIG. 1, the cylinder member has its base end connected to the associated frame member by a pivot connection 40 while the rod end of the piston member is connected to the carriage 28 by a pivotal connection 42. Accordingly, when pressurized fluid is directed to the base end of the hydraulic cylinder 38 while the piston end thereof is vented, the piston rod is moved vertically downwardly resulting in the carriages 28 being moved from the position of FIG. 2 to the ground level position. This movement causes a platform 44, after it is deployed, to be moved as a unit from an elevated position to the ground level position.

It will be noted that the aforementioned steps form a part of the platform 44 which is located in the stepwell 12. The platform 44 consists of a plurality of hinged sections that extend between the guide bars. As seen in FIG. 1, the platform 44 comprises a pair of planar base sections 46 and 48 which are pivotally interconnected at their inner ends by a pivotal connection 50 for movement about a horizontal axis that is substantially parallel to the longitudinal axis of the vehicle. As seen in FIG. 1, the platform 44 is shown in the collapsed or folded position wherein it is disposed adjacent to a vertical back wall 52 formed rigidly with the body of the vehicle 14. In the collapsed position, the base section 48 is located in a vertical plane adjacent back wall 52 and has its upper end connected by pivotal connection 54 to the carriage 28, while the base section 46 is located in a horizontal plane. The base sections 46 and 48 support a tread member 56 and a riser member 58 which are sections of the platform that also extend between the guide bars. The riser member 58 has one end connected by a pivotal connection 60 to the base section 46 intermediate the ends thereof. The other end of the riser member 58 is connected to one end of the tread member 56 by a piano hinge that provides a pivotal connection 62 as seen in FIG. 1. The other end of the tread member 56 is connected to the base section 48 by a pivotal connection 64 intermediate the ends of the base section 48. The base section 46, between pivotal connections 60 and 50, and the base section 48, between pivotal connections 50 and 64, are respectively formed with wells 66 and 68 having a depth and longitudinal length corresponding to the width and longitudinal length of the associated tread and riser members 56 and 58 so as to allow storage of the latter when the platform 44 is deployed to the extended or unfolded position shown in FIG. 2.

The deployment of the platform 44 to the unfolded positions of FIG. 2 is realized through a two-link supporting linkage arrangement incorporated with each of the carriages 28. The linkage arrangement includes a double-acting hydraulic cylinder 70 that serves as an extensible and contractible link member. In addition, a rigid link member 72 is provided and together with the hydraulic cylinder 70 is carried by the carriage 28. The hydraulic cylinder 70 consists of a cylinder member and a relatively reciprocating piston member with the base portion of the cylinder member being connected to the carriage 28 by a pivotal connection 74. The piston member of the hydraulic cylinder 70 is connected to the base section 48 intermediate the ends thereof by a pivotal connection 76. The rigid link member 72 has one end thereof pivotally connected to the carriage 28 by a pivotal connection 78 while the other end is connected to the outboard end of the base section 46 by a pivotal connection 80.

From the above description, it should be apparent that when the wheelchair lift device 10 has the parts thereof located in the normal position as seen in FIG. 1, the tread and riser members 56 and 58 are disposed in substantially mutually perpendicular planes so as to form the riser and tread portions of one step while the outer end of the base section 46 forms the tread portion of a second step. Thus, an able-bodied person can gain entrance into the vehicle 14 by first stepping on the outer end of the base section 46 and then on the tread member 56 and finally on the floor 16 of the vehicle. If, however, a physically handicapped person in a wheelchair should wish to gain entrance into the vehicle 14, the vehicle operator would actuate a control valve of a suitable hydraulic control system (not shown) that would direct pressurized fluid to the piston rod end of the hydraulic cylinder 70 while venting the base end of the cylinder member. This would cause contraction of the hydraulic cylinder 70 by having the piston rod thereof drawn into the cylinder member with resultant pivoting of the base section 48 in a clockwise direction about the pivotal connection 54. As the base section 48 rotates in this manner, it carries the base section 46 upwardly and outwardly relative to the stepwell 12 about the same pivotal connection 54 under the control of the link member 72 which is pivoted in a clockwise direction about pivotal connection 78. This movement of the link members 70 and 72 continues until the base sections 46 and 48 are horizontally aligned with the floor 16 of the vehicle as seen in FIG. 2. In order to assure proper alignment, stop tabs 82 and 83 are provided on the base sections 46 and 48 respectively adjacent the pivotal connection 50. At this point, the platform 44 is fully deployed to form a horizontal support surface for the wheelchair.

It will be noted that as the platform 44 moves from the folded or collapsed position of FIG. 1 to the deployed position of FIG. 2, the tread and riser members 56 and 58 move into the associated wells 66 and 68 formed in the base sections 46 and 48 so as to provide a substantially level, flat support surface. After the platform 44 is in the position of FIG. 2, the operator, through the appropriate movement of the aforementioned control valve, will cause the base end of the hydraulic cylinder 38 to be pressurized while the piston rod end thereof is vented. As a result, the piston rod of the hydraulic cylinder 38 moves out of the associated cylinder member and causes the associated carriage 28 to move downwardly along its guide bar and at the same time lowers the platform 44 from the elevated position of FIG. 2 to the ground level position shown in phantom lines. The wheelchair can then be rolled onto the platform 44 and locked into position. The vehicle operator then reverses the procedure, causing the piston rod end of the hydraulic cylinder 38 to receive pressurized fluid and the base end thereof to be vented so that contraction of the cylinder 38 occurs, resulting in the carriage 28 and the platform 44 to be returned to the FIG. 2 position wherein the platform 44 is once again horizontally aligned with the floor 16. The wheelchair is then rolled onto the floor 16 after which pressurized fluid is directed to the base end of the hydraulic cylinder 70 causing the base section 48 to be rotated in a counterclockwise direction about the pivotal connection 54 so as to return the various parts of the platform 44 to the folded position of FIG. 1 wherein the steps are formed for normal usage of the vehicle entrance.

Although not shown, it will be understood that the outer end of the base section 46 can be provided with a tapered ramp portion so as to facilitate rolling of the wheelchair onto the platform 44 when the latter is in the ground level position of FIG. 3. Also, in order to eliminate the possibility of an over-center action that could prevent the tread and riser members 56 and 58 from properly returning to the step forming position of FIG. 1 after they are located in the aligned position of FIG. 2, the tread and riser members 56 and 58 can be sized so that the center of the piano hinge or pivotal connection 62 is slightly above a horizontal plane passing through the centers of pivotal connections 60 and 64 when the platform 44 is in the FIG. 2 position. Another manner of accomplishing the same result would be to incorporate a spring at the pivotal connection 62 which would continuously bias the tread and riser members 56 and 58 towards the step forming position of FIG. 1.

In order to make certain that the hinged sections of platform 44 will positively maintain the horizontal load supporting position of FIG. 2 when deployed and that they will also positively maintain the step forming position of FIG. 1 when folded, a locking arrangement made according with the invention is provided. In this regard, it will be noted that a first latch 84 is combined with the carriage 28 for locking the base section 48 in the horizontal position of FIG. 2 while a second latch 86 is mounted on the wall 52 for locking the base section 46 to the vehicle body and thereby assuring that the hinged sections maintain the step forming position as seen in FIG. 1.

As best seen in FIGS. 3-5, the latch 84 includes a lock member 88 that is supported within a slot 87 in the carriage 28 by a pin 90 for pivotal movement about a horizontal axis. The pin 90 has the ends thereof mounted within suitable bores formed in a pair of bracket members 92 and 94 which are secured to the carriage 28. The lock member 88 is formed with an arm 96 at its upper end and a hook portion 98 at its lower end, and a coil spring 100 is wound about the pin 90 for biasing the lock member 88 in a clockwise direction as seen in FIG. 3. In this connection, it will be noted that the intermediate portion 102 of the spring 100 is U-shaped and engages the arm 96 while the free ends of the spring are secured to the bracket members 92 and 94. Thus, when the lock member 88 is pivoted in a counterclockwise direction to the phantom line position of FIG. 3, the spring 100 is torsional wound and provides a yielding force to such movement which permits the spring 100 to return the lock member to the full line position.

The lock member 88 is normally located in the full line position of FIG. 3. A release device 104 consisting of an air cylinder 106 and a release lever 108 is mounted on the carriage adjacent to the lock member 88 and serves to move the lock member 88 from the full line locked position to the phantom line unlocked position as seen in FIG. 3. The arm 96 normally engages the lever 108 and causes the hook portion 98 to be normally located in the path of movement of the side edge of the base section 48. Accordingly, when the platform 44 is deployed to the horizontal support position of FIG. 2, the upper surface 105 of the base section 48 initially engages the curved-upwardly inclined surface 107 of the hook portion 98 and causes the lock member 88 to be pivoted counterclockwise out of the path of the base section. As the surface 105 moves above the hook portion, an opening 103 in the side of the base section moves into horizontal alignment with the hook portion 98 and the hook portion 98 moves clockwise into the opening 103 under the influence of the spring 100. At this point the base section 48 is in a locked state relative to the carriage 28 and the cylinder 70 could be disabled or removed and the hinged sections of the platform 44 would maintain the horizontal load supporting position of FIG. 2.

To unlock the lock member 88, the rod end of the air cylinder 106 is connected with a source of pressurized air so as to cause the rod 110 to act through a pin and slot connection 109 to raise the release lever 108 about a stationary pivot connection 112 in a clockwise direction to the phantom line position of FIG. 3. This movement causes a curved outer surface 114 on the release lever 108 to move the lock member 88 to the phantom line unlocked position to thereafter allow the platform 44 to be returned to the step forming position of FIG. 1. A spring can be provided in the base end of the air cylinder 106 to normally maintain the rod 110 in the full line position of FIG. 3. In addition, it should be noted that the pivot connection 112 serves to connect the release lever 108 to the carriage 28 and that the valve controlling pressurized air supply to the air cylinder 106 can be combined with the control valve which supplies hydraulic fluid to the cylinder 70. The arrangement would be such that when the hydraulic control valve is moved to direct pressurized hydraulic fluid to the base end of the cylinder 70, the air control valve would be simultaneously actuated to cause pressurized air to be directed to the base end of cylinder 106 to raise the rod 110 and unlock the lock member 88.

When the platform 44 is returned to the step forming position of FIG. 1 from the FIG. 3 position, a projection 116 rigidly fixed to each side of the base section 46 extends through vertically oriented slots formed in the wall 52. One of the slots is designated by the reference numeral 118. The latch 86 is then actuated so as to cause a pair of lock bolts, one of which is shown in FIG. 6 and identified by reference numeral 120, to move into an accommodating aperture 122 formed in each of the projections 116. In this manner, the base section 46 as well as the other sections of the platform 44 is positively fixed to the vehicle body assuring that the sections will maintain the step forming position of FIG. 1.

The latch 86 includes a bell crank 124 that is pivotally supported by a bracket 126 fixed with the wall 52. The bell crank 124 is fixed to a pin 128 which in turn is fixed with an arm 130. An air cylinder 132 has its base end connected by a pivotal connection 134 to a support bracket 136 fixed to the vehicle frame. The rod end of the cylinder 132 is connected by a pivotal connection 138 to the arm 130. Thus, by directing pressurized air to the base end of the cylinder 132, the piston rod thereof moves outwardly relative to the cylinder member causing the arm 130 and bell crank 124 to rotate counterclockwise as viewed in FIG. 6 and to act through identical links 140 and rods 142 to withdraw the lock bolts 120 from the brackets 116. Each link 140 has one end thereof connected to the bell crank 124 by a pivotal connection 144 and the other end connected to the associated rod by a pivotal connection 146. The rod 142, in each case, is supported by guide members 148 and 150 which insure that the rod moves in a straight line along its longitudinal axis.

It will be noted that as in the case with air cylinder 106, a spring can be provided in the rod end of the air cylinder 132 so that the normal position of the latch 86 would be as seen in FIG. 6 and pressurized fluid would be required to be directed to the base end of the cylinder to place the latch in the unlocked position to allow the platform to be deployed.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In a lift device having a foldable platform located in the doorway of a motor vehicle for raising and lowering a load between a first position wherein the platform is in horizontal alignment with an elevated floor formed with the motor vehicle and a second position wherein the platform is at ground level, said device comprising a pair of substantially vertically oriented guide bars secured to said vehicle at the opposite sides of said doorway, a carriage mounted on each of said guide bars for moving said platform between said first and second positions, said platform comprising a pair of planar base sections and a tread section and a riser section adapted to be moved from a step forming position to a load support position, a latch for locking one of the base sections to the carriage when the sections are in said load support position, said latch including a bracket secured to said carriage, a lock member pivotally mounted on said bracket and having an arm at one end and a hook portion at the other end adapted to move into an opening formed in said one of the base sections when the latter is located in the load support position, a spring continuously biasing said lock member into a locked position wherein said hook portion is located in the path of movement of said one of the base sections, said hook portion having a curved outer surface which allows said one of the base sections to engage said curved surface to move the lock member against the bias of said spring to an unlocked position prior to said hook portion moving into said opening as the sections move from the step forming position to the load support position, a lever pivotally supported by said carriage and having a contact surface located adjacent said arm of the lock member, and power-operated means for pivoting said lever whereby said contact surface engages said arm and moves the lock member to the unlocked position to release said one of the base sections.

2. In a lift device having a foldable platform located in the doorway of a motor vehicle that is defined by a pair of side frame members and a back wall connected to the elevated floor in said vehicle, said device adapted to raise and lower a load between a first position wherein the platform is in horizontal alignment with said elevated floor formed with the motor vehicle and a second position wherein the platform is at ground level and including a pair of substantially vertically oriented guide bars secured to said side frame members of said doorway, a carriage mounted on each of said guide bars for moving said platform between said first and second positions, said platform comprising a pair of planar base sections and a tread section and a riser section adapted to be moved from a step forming position to a load support position, a first pivot connection joining adjacent ends of said pair of base sections for pivotal movement about a horizontal axis, a second pivot connection joining adjacent ends of said tread section and said riser section for pivotal movement about an axis parallel to said horizontal axis, third and fourth pivot connections joining said riser section and said tread sections to said base sections whereby said sections are movable between said step forming position and said load support position, a linkage connecting the carriage with said base sections for supporting the platform, means combined with said linkage and operatively connected to said carriage for causing said linkage to swing outwardly relative to the doorway whereby the sections move from the step forming position to the load support position, a projection having an opening formed therein, said projection being rigidly attached to one of said base sections and adapted to extend through a slot formed in said back wall when the base sections are in said step forming position, a latch for locking said projection to said back wall, said latch including an elongated lock bolt supported by said back wall for longitudinal movement, a bellcrank having one end thereof connected to said lock bolt, and a power operated cylinder connected to the other end of said bellcrank for rotating the latter in one direction so as to cause the lock bolt to move into the opening in said projection to lock said sections to said back wall and for rotating the bellcrank in a direction opposite to said one direction to cause the lock bolt to be retracted from said opening so as to permit said linkage to move said base sections from said step forming position to said load position.

3. In a lift device having a foldable platform located in the doorway of a motor vehicle that is defined by a pair of side frame members and a back wall connected to the elevated floor in said vehicle, said device adapted to raise and lower a load between a first position wherein the platform is in horizontal alignment with said elevated floor formed with the motor vehicle and a second position wherein the platform is at ground level and including a pair of substantially vertically oriented guide bars secured to said side frame members of said doorway, a carriage mounted on each of said guide bars for moving said platform between said first and second positions, said platform comprising a pair of planar base sections and a tread section and a riser section adapted to be moved from a step forming position to a load support position, a first pivot connection joining adjacent ends of said pair of base sections for pivotal movement about a horizontal axis, a second pivot connection joining adjacent ends of said tread section and said riser section for pivotal movement about an axis parallel to said horizontal axis, third and fourth pivot connections joining said riser section and said tread sections to said base sections whereby said sections are movable between said step forming position and said load support position, a linkage connecting the carriage with said base sections for supporting the platform, means combined with said linkage and operatively connected to said carriage for causing said linkage to swing outwardly relative to the doorway whereby the sections move from the step forming position to the load support position, a first latch for locking one of the base sections to the carriage when the sections are in said load support position, said first latch comprising a bracket secured to said carriage, a lock member pivotally mounted on said bracket and having an arm at one end and a hook portion at the other end adapted to move into an opening formed in said one of the base sections when the latter is located in the load support position, a spring continuously biasing said lock member into a locked position wherein said hook portion is located in the path of movement of said one of the base sections, said hook portion having a curved outer surface which allows said one of the base sections to engage said curved surface to move the lock member against the bias of said spring to an unlocked position prior to said hook portion moving into said opening as the sections move from the step forming position to the load support position, a lever pivotally supported by said carriage and having a contact surface located adjacent said arm of the lock member, a power-operated means for pivoting said lever whereby said contact surface engages said arm and moves the lock member to the unlocked position to release said one of the base sections, a second latch for locking the other of said base sections to said back wall when the sections are in said step forming position, said second latch including a projection having an opening formed therein, said projection being rigidly attached to said other of said base sections adjacent said first pivot connection and adapted to extend through a slot formed in said back wall when the base sections are in said step forming position, an elongated lock bolt supported by said back wall for longitudinal movement, a bellcrank having one end thereof pivotally connected to said lock bolt, and a power-operated cylinder pivotally connected to the other end of said bellcrank for rotating the latter in one direction so as to cause the lock bolt to move into the opening in said projection to lock said sections to said back wall and for rotating the bellcrank in a direction opposite to said one direction to cause the lock bolt to be retracted from said opening so as to permit said linkage to move said base sections from said step forming position to said load position.

* * * * *